US005262224A

United States Patent [19]

Ozaki et al.

[11] Patent Number: 5,262,224

[45] Date of Patent: Nov. 16, 1993

[54] PRINTED LAMINATE

[75] Inventors: Yoshihide Ozaki, Tokyo; Yoshihiko Ito; Jun Takahashi, both of Yokohama, all of Japan

[73] Assignee: Diafoil Hoechst Company, Limited, Tokyo, Japan

[21] Appl. No.: 898,910

[22] Filed: Jun. 15, 1992

[30] Foreign Application Priority Data

Jun. 24, 1991 [JP] Japan .................................. 3-151868
Feb. 6, 1992 [JP] Japan .................................. 4-21419

[51] Int. Cl.$^5$ .......................... B32B 27/14; B05D 1/36

[52] U.S. Cl. .................................... 428/195; 428/451; 428/423.7; 428/447; 428/483; 428/481; 428/497; 428/475.2; 428/516; 428/518; 428/520

[58] Field of Search ............... 428/483, 195, 481, 447, 428/497, 451, 423.7, 518, 520, 516, 475.2

[56] References Cited

U.S. PATENT DOCUMENTS 4,780,348 10/1988 Yamamato et al. .................... 428/43
4,952,426 8/1990 Guttag ................................ 427/258

FOREIGN PATENT DOCUMENTS 1102775 3/1961 Fed. Rep. of Germany .
3247677 6/1984 Fed. Rep. of Germany .
3447713 7/1985 Fed. Rep. of Germany .

*Primary Examiner*—P. C. Sluby
*Attorney, Agent, or Firm*—Foley & Lardner

[57] ABSTRACT

Disclosed herein is a printed laminate comprising a printed matter and a polyester film having at least on its outer air side a coating layer composed of a water-soluble or water-dispersible resin and a lubricant, said polyester film being laminated on the printing surface of said printed matter.

19 Claims, No Drawings

PRINTED LAMINATE

BACKGROUND OF THE INVENTION

The present invention relates to a printed laminate having excellent adhesiveness to hot-stamping foil, printing ink, etc., and markedly improved in scratch resistance, workability and glossiness.

Surface coating or printed lamination comprising laminating plastic films is practiced for the purpose of surface protection of prints and providing a gloss finish. Indeed the spread of printed lamination which has a high effect for surface protection and provides a gloss finish, is remarkable in recent years. The printed laminates having excellent gloss with depth have been employed selectively for high-grade finish of the boxes of cosmetics, etc.

As the film used for printed lamination, polypropylene film has been used and polyvinyl chloride film has been used for printed lamination for high-grade articles and boxes. However, polypropylene film is poor in glossiness and also inferior in adhesiveness to hot-stamping foil, printing ink, etc., so that the laminates using this film are worse in case-making property. Also, polyvinyl chloride film has problems relating to fish eye and thickness uniformity. Polyvinyl chloride film further has the problem of generation of chlorine gas when the printed laminate using this film is incinerated.

As a solution to these problems, use of polyester film as a base film has been proposed and studied. Polyester film, however, is poor in adhesiveness to printing ink and hot-stamping foil which are printed on the surface of the polyester film and as a result, it has a problem that its use is limited to specific applications. For improving adhesiveness, there have been proposed various methods such as applying a corona discharge treatment or coating on the surface of the polyester film. Nevertheless, none of these methods is capable of providing a satisfactory improvement of adhesiveness, and it is rather pointed out that these methods could cause a damage to the film surface or deteriorate the glossiness. Further, because of the unsatisfactory antistatic property, polyester film has the problem that it tends to collect dust such as paper dust, thereby impairing the visual appearance of the product.

As a result of strenuous studies for overcoming these problems, it has been found that by laminating a polyester film having a coating layer composed of a water-soluble or water-dispersible resin and a lubricant on the printed surface of a printed matter (sheet or substrate) so as to situate the coating layer on the outer air side, the thus-obtained printed laminate has excellent scratch resistance and glossiness, and is also excellent in adhesiveness to hot-stamping foil, printing ink, etc. which are printed on the surface thereof and in workability in production thereof. The present invention was achieved on the basis of this finding.

SUMMARY OF THE INVENTION

In a first aspect of the present invention, there is provided a printed laminate comprising a printed matter and a polyester film having at least on its outer air side a coating layer composed of a water-soluble or water-dispersible resin, and a lubricant, the polyester film being laminated on the printed surface of the printed matter.

In a second aspect of the present invention, there is provided a printed laminate comprising a printed matter and a polyester film having at least on its outer air side a coating layer composed of a water-soluble or water-dispersible resin, a water-soluble or water-dispersible antistatic polymeric compound having a sulfonic group or sulfonic salt group in the molecule, and a lubricant, the polyester film being laminated on the printed surface of the printed matter.

In a third aspect of the present invention, there is provided a printed laminate material comprising a polyester film, a coating layer composed of a water-soluble or water-dispersible resin and a lubricant and formed on one side of the polyester film, and an adhesive layer or a heat-fusible polymer layer formed on the other side of the polyester film.

In a fourth aspect of the present invention, there is provided a printed laminate material comprising a polyester film, a coating layer composed of a water-soluble or water-dispersible resin, a water-soluble or water-dispersible antistatic polymeric compound having a sulfonic group or a sulfonic salt group in the molecule and a lubricant, the coating layer formed on one side of the polyester film, and an adhesive layer or a heat-fusible polymer layer formed on other side of the polyester film.

DETAILED DESCRIPTION OF THE INVENTION

The polyester in the present invention is a polymer produced by polycondensing an aromatic dicarboxylic acid such as terephthalic acid, isophthalic acid, naphthalenedicarboxylic acid, etc. and an ester thereof, and a glycol such as ethylene glycol, diethylene glycol, 1,4-butanediol, neopentyl glycol, 1,4-cyclohexanedimethanol, etc.

The polyester composed of these acid components and these glycol components can be produced according to an ordinary method. For example, there can be employed a method in which an ester exchange reaction is carried out between a lower alkyl ester of an aromatic dicarboxylic acid and a glycol; or a method in which an aromatic dicarboxylic acid and a glycol are directly esterified to form substantially a bisglycol ester of the aromatic dicarboxylic acid or a low polymer thereof, and the thus-obtained ester or low polymer is polycondensed under reduced pressure at a temperature of 240° C. or more. In this reaction, various additives such as an ordinary catalyst, stabilizer, etc., may be added properly.

Typical examples of the polyesters are poly(ethylene terephthalate), poly(ethylene naphthalate) and poly(butylene terephthalate). These polyesters may be homopolymers or the polymers in which a third component has been copolymerized. A mixture of these polyesters is also usable.

The polyester film may contain various kinds of stabilizer, ultraviolet absorber, lubricant, pigment, antioxidant, plasticizer, antistatic agent and other additives.

The thickness of the polyester film used in the present invention is 4 to 100 μm, preferably 6 to 50 μm.

As the water-soluble or water-dispersible resins usable in the present invention, starch, cellulose derivatives such as methyl cellulose and hydroxyethyl cellulose, alginic acid, gum arabic, gelatin, sodium polyacrylate, polyacrylamide, polyvinyl alcohol, polyethylene oxide, polyvinylpyrrolidone, urethane resins, acrylic resins, polyamides, ether resins, epoxy resins and polyesters may be exemplified. Urethane resins, acrylic resins and polyesters are preferred.

As the urethane resins usable in the present invention, water-soluble or water-dispersible urethane resins produced from a polyisocyanate and a polyol as main components in the presence of a chain-lengthening agent, a crosslinking agent, etc. are preferred. For preparing the water-soluble or water-dispersible urethane resin, it is common practice to introduce a hydrophilic group into the polyisocyanate, polyol and chain-lengthening agent. It is also a well known method for producing the water-soluble or water-dispersible urethane resin comprising reacting an unreacted isocyanate group of the polyurethane with a compound having a hydrophilic group.

As the acrylic resins usable in the present invention, the water-soluble or water-dispersible acrylic resins produced by copolymerizing vinyl monomers having a reactive functional group such as carboxyl group or a salt thereof, acid anhydride group, sulfonic group or a salt thereof, amide group, amino group, hydroxyl group, epoxy group, etc., with an alkyl acrylate or methacrylate as main components are preferred.

Examples of the dicarboxylic acid components of the polyesters in the present invention are aromatic dicarboxylic acids such as terephthalic acid, isophthalic acid, 2,6-naphthalenedicarboxylic acid, etc.; aliphatic dicarboxylic acids such as adipic acid, azelaic acid, sebacic acid, etc.; oxycarboxylic acids such as oxybenzoic acid, and their ester-forming derivatives. Examples of the glycol components of the polyesters in the present invention are aliphatic glycols such as ethylene glycol, 1,4-butanediol, diethylene glycol, triethylene glycol, etc.; alicyclic glycols such as 1,4-cyclohexanedimethanol, etc.; aromatic diols such as p-xylenediol, etc.; and poly(oxyalkylene) glycols such as polyethylene glycol; polypropylene glycol; polytetramethylene glycol, etc.

The polyesters usable in the present invention are not only limited to the saturated linear polyesters composed of the ester-forming components, but also it is possible to use those resins produced by using, as the ester-forming component, a compound having a tri- or more multivalent ester-forming components or a compound having a reactive unsaturated group. The polyesters having a functional group such as sulfonic acid, carboxylic acid, phosphoric acid or a salt thereof for improving solubility or dispersibility in water are preferred.

In the present invention, the resins may be used in combination.

The water-soluble or water-dispersible antistatic polymeric compound having a sulfonic group or sulfonic salt group in the molecule in the present invention has the function of imparting an antistatic property to the coating layer without reducing its adhesiveness to printing ink, hot-stamping foil, etc.

The water-soluble or water-dispersible antistatic polymeric compound used in the present invention is preferably one having a molecular weight of not less than 500, preferably 1,000 to 1,000,000. A low-molecular weight compound such as sodium alkylsulfonate is usually contained in the coating layer for imparting an antistatic property thereto. However, by the blending content of such antistatic compound, this compound may bleed out to the surface of the coating layer, thereby reducing the adhesion property. Such reduction of adhesiveness is especially conspicuous when the laminate is kept under a high-temperature and high-humidity condition.

As the water-soluble or water-dispersible antistatic polymeric compounds having a sulfonic group or sulfonic salt group in the molecule in the present invention, polymers obtained by copolymerizing at least one monomer selected from the group consisting of vinylsulfonic acid, vinylsulfonates (sodium vinylsulfonate, potassium vinylsulfonate, lithium vinylsulfonate, ammonium vinylsulfonate, etc.), allylsulfonic acid, allylsulfonates (sodium allylsulfonate, potassium allylsulfonate, lithium allylsulfonate, ammonium allylsulfonate, etc.), methallylsulfonic acid, methallylsulfonates (sodium methallylsulfonate, potassium methallylsulfonate, lithium methallylsulfonate, ammonium methallylsulfonate, etc. and sulfopropylacrylic esters or salts thereof, and at least one monomer copolymerizable therewith, by means of an appropriate method such as an emulsion polymerization method without emulsifier and a solution polymerization method.

As the copolymerizable monomers, esters composed of acrylic or methacrylic acids and lower alcohols such as methanol, ethanol, propanol, butanol, pentanol, hexanol, heptanol, octanol, 2-ethylhexanol, etc.; hydroxyalkyl esters, alkoxyalkyl esters, alkylalkylene glycol esters or glycidyl esters of acrylic or methacrylic acid; styrene and styrene derivatives such as monoalkylstyrene, dialkylstyrene, trialkylstyrene, etc. may be exemplified. Among the above compounds, preferred for use in the present invention are those containing at least one vinylsulfonic acid or vinylsulfonate in an amount of 10–70 mol %, preferably 15–50 mol %, as a component of the copolymer. If the content of vinylsulfonic acid or vinylsulfonate is less than 10 mol %, it tends to be difficult to impart a satisfactory antistatic activity to the copolymer itself, and if the said content exceeds 70 mol %, the polymerizability tends to deteriorate.

As lubricant in the present invention, there can be used anionic surfactants, cationic surfactants, amphoteric surfactants, nonionic surfactants, fluoric surfactants, organic carboxylic acids or derivatives thereof, higher aliphatic alcohols, paraffins, waxes, organopolysiloxanes, water-soluble or water-dispersible polyolefins, etc. Water-soluble or water-dispersible polyolefins are preferred.

As the water-soluble or water-dispersible polyolefins usable in the present invention, substances mentioned below may be exemplified as a basic skeleton.

(i) Wax, resin or rubber-like material composed of a homopolymer or copolymer of a 1-olefinic unsaturated hydrocarbons such as ethylene, propylene, 1-butene, 4-methyl-1-pentene, etc., the homopolymer or copolymer being, for instance, polyethylene, polypropylene, poly-1-butene, poly-4-methyl-1-pentene, ethylene-propylene copolymer, ethylene-1-butene copolymer, propylene-1-butene copolymer or the like.

(ii) Rubber-like copolymers composed of two or more of the above-mentioned 1-olefinic unsaturated hydrocarbons and conjugated or non-conjugated dienes, for example, the rubber-like copolymer being ethylene-propylene-butadiene copolymer, ethylene-propylene-dicyclopentadiene copolymer, ethylene-propylene-ethylidene norbornene copolymer and ethylene-propylene-1,5-hexadiene copolymer.

(iii) Copolymers composed of 1-olefinic unsaturated hydrocarbons and conjugated or non-conjugated dienes, the copolymer, for example, being ethylene-butadiene copolymer, isobutene-isoprene copolymer and ethylene-ethylidene norbornene copolymer.

(iv) Copolymers composed of 1-olefinic unsaturated hydrocarbons, especially ethylene, and vinyl acetate, and their completely or partially saponified products.

(v) Graft copolymers obtained by grafting the conjugated or non-conjugated dienes or vinyl acetate to the homopolymers or copolymers composed of 1-olefinic unsaturated hydrocarbons, and their completely or partially saponified products.

These polyolefins may be used as one dissolved or dispersed in water.

For dissolving or dispersing the polyolefins in water and stabilizing the dissolved or dispersed polyolefins so that there is no agglomeration of polyolefin particles, a method may be employed in which a known surfactant is used jointly or a hydrophilic polymer such as a water-soluble polyester is allowed to coexist with the polyolefins when dispersed.

There may also be used the polyolefins which have been made easily soluble or dispersible in water by introducing a vinyl compound having a hydrophilic group such as carboxyl group, sulfo group, amino group, polyether, alkylolamide group or a salt thereof into the polyolefin skeleton by means of copolymerization or graft polymerization.

The contents of each component of the coating layer according to the present invention are as follows:

(I) water-soluble or water-dispersible resin: 76.9–99.9 wt %, preferably 85–99.5 wt %; and lubricant: 0.1–23.1 wt %, preferably 0.5–15 wt % (corresponding to 0.1–30 parts by weight of lubricant based on 100 parts by weight of water-soluble or water-dispersible resin); or (II) water-soluble or water-dispersible resin: 10–90 wt %, preferably 20–80 wt %; water-soluble or water-dispersible antistatic polymeric compound having sulfonic group or sulfonic salt group in the molecule: 10–90 wt %, preferably 20–80 wt %; and lubricant: 0.1–30 wt %, preferably 0.5–15 wt %.

In the composition (I), if the content of the lubricant is below the above-defined range, the slipperness and scratch resistance of the coat surface may be deteriorated. If the content exceeds the above-defined range, the adhesiveness to printing ink, hot-stamping foil, etc., may be reduced and the coat surface may become sticky.

In the composition (II), if the content of the water-soluble or water-dispersible antistatic polymeric compound is less than 10 wt %, the desired antistatic effect may not be provided, and if its content exceeds 90 wt %, glossiness of the coating layer may be deteriorated. Also, in the case of too low content of the lubricant, the slipperness and scratch resistance of the coat surface is deteriorated, while in the case of too high content of the lubricant, the coat surface becomes sticky and adhesiveness to printing ink, hot-stamping foil, etc. is reduced.

A crosslinking agent, inorganic particles and/or organic particles may be contained in the coating layer for improving anti-block properties, etc. There may also be contained, if necessary, other additive(s) such as antistatic agent, defoaming agent, coating properties modifier, thickener, antioxidant, ultraviolet absorber, dye, etc.

The thickness of the coating layer in the laminates according to the present invention is usually in the range of 0.01–3 μm, preferably 0.02–1 μm. If its thickness is less than 0.01 μm, it is difficult to obtain a uniform coating layer. If the thickness is more than 3 μm, the slipperness is reduced to make handling of the film difficult.

For forming the coating layer on a polyester film, there can be employed a known method such as gravure coating method, reverse coating method, rod coating method, air doctor coating method, etc. Concretely, the following methods may be applied: the coating solution according to the present invention is applied on an unstretched polyester film and the thus-obtained coated film is biaxially stretched successively or simultaneously; the coating solution is applied on a monoaxially stretched polyester film and the thus-obtained coated film is further stretched in the direction orthogonal to the direction of initial monoaxial stretching; and the coating solution is applied on a biaxially stretched polyester film.

Adhesion between polyester film and coating layer can be improved by applying a chemical treatment or a discharge treatment to the polyester film before coating.

It is essential for the printed laminates according to the present invention that the coating layer be formed on the side of the polyester film exposed to the atmosphere (such side is described as "outer air side" in the present specification). On the printed matter side of the polyester film, there may be provided various layers intended mainly for elevating adhesiveness. For example, there may be used the same coating layer, an adhesive layer or a heat-fusible polymer layer. Further, these may be used in suitable combination thereof.

For elevating adhesion between polyester film and adhesive layer or heat-fusible polymer layer, the polyester film may be subjected to a chemical treatment or a discharge treatment before forming the said layer(s).

The "printed matter" referred to in the present invention means a substrate such as art paper, coated paper, slick paper, Japanese paper, synthetic paper, film or the like on which printing has been made. It may be a simple paper or a laminate. The printing may be performed by various methods such as gravure printing method, offset printing method, letterpress printing method, intaglio printing method, flexographic printing method, etc.

The printed laminate of the present invention can be obtained by, for example, a method in which an adhesive such as polyester adhesives and acrylic resin adhesives, dissolved in an organic solvent is applied on a polyester film at the coating portion of a laminator and after drying, the adhesive applied on the polyester film and the printed surface of a printed matter are subjected to thermocompression bonding; or a method in which a heat-fusible polymer such as ethylene-vinyl acetate copolymer and ethylene-ethyl acrylate copolymer is laminated on a polyester film, and the thus-laminated polymer layer on the polyester film and the printed surface of a printed matter are subjected to thermocompression bonding.

The printed laminate according to the present invention is excellent in adhesiveness to hot-stamping foil, printing ink, etc., scratch resistance and glossiness, and its industrial value is high.

Especially, in the case where a water-soluble or water-dispersible antistatic polymeric compound having a sulfonic group or a sulfonic salt group in the molecule is contained in the coating layer, the surface resistivity of the coating layer becomes not more than $10^{12}$ Ω/□, preferably not more than $10^{11}$ Ω/□, so that there takes place no adhesion of dust, paper dust etc. to the laminate during working thereof, and as a result the printed laminate of the present invention is excellent in visual appearance and high in its commercial value. Further, there is eliminated the possibility of the printed laminates being stuck to each other by static charge, so that workability is improved.

EXAMPLES

The present invention will be further described with reference to the examples thereof, which examples, however, are merely intended to be illustrative and not to be construed as limiting the scope of the invention.

In the following Examples, all "parts" are "part by weight" (on solid basis) unless otherwise noted.

The property evaluations in the Examples were made in the following ways.

(1) Adhesiveness

A. Adhesiveness to Hot-Stamping Foil

A hot-stamping foil (produced by Nakai Kogyo Co., Ltd.) was transferred onto the surface of the coating layer of a printed laminate by an up-and-down system and then a cellophane adhesive tape (produced by Nichiban Co., Ltd.) was stuck to the hot-stamping foil on the coating layer and quickly peeled off arcuately through the angle of 180°. Adhesiveness was evaluated on the following criterion.

○: No foil peeled off at all.
Δ: Less than 50% of the foil peeled off.
x: Not less than 50% of the foil peeled off.

Further, the above hot-stamped test sample was subjected to the same evaluation of adhesiveness after being kept at 40° C. and 80% RH for 48 hours.

B. Adhesiveness to Printing Ink

A screen ink [a mixture (mixing ratio of 10:1) of FDSS21 391 Indigo and Reducer P"] (produced by Toyo Ink Co., Ltd.) was applied on the surface of the coating layer of a printed laminate to a thickness of about 10 μm by using a 300-mesh silk screen and hardened by a UV lamp. After hardening, a cellophane adhesive tape (produced by Nichiban Co., Ltd.) was stuck to the ink coat and quickly peeled off arcuately through the angle of 180°. The following criterion was used for evaluation of adhesiveness.

○: No ink coat peeled off at all.
Δ: Less than 50% of the coat peeled off.
x: Not less than 50% of the ink coat peeled off.

The above ink printed test sample was also subjected to the same evaluation of adhesiveness after being kept at 40° C. and 80% RH for 48 hours.

(2) Scratch Resistance

The surface of the coating layer of a printed laminate was rubbed several times with the back of a nail and the degree of scratching was judged. The criterion for judgment was as follows.

○: Almost no scratch.
Δ: Slight scratches.
x: Deep scratches.

(3) Glossiness

Glossiness of the printed laminates was judged on the following criterion.

○: No unevenness of gloss, and uniform and excellent glossiness.
x: Unevenness of gloss and poor in glossiness.

(4) Antistatic Properties

Surface resistivity of the surface of the coating layer of a printed laminate was measured under an atmosphere of 23° C. and 50% RH, applying a voltage of 100 V, by using a concentric circular electrode 16008A (mfd. by Yokokawa Hewlet Packard, Ltd.) having a 50 mm-diameter inner electrode and a 70 mm-diameter outer electrode and a high resistance meter 4329A (mfd. by Yokokawa Hewlet Packard, Ltd.).

EXAMPLE 1

Polyethylene terephthalate having an intrinsic viscosity of 0.65 and containing additive particles was melt extruded at 280–300° C. onto a cooling drum of about 60° C. applying a static charge thereon to form a sheet. This sheet was stretched 3.5 times in the machine direction at 83° C., and then one side of the resulting stretched film was coated with a coating solution composed of 95 parts of PRIMAL HA-12 (an aqueous dispersion of polyacrylate, produced by Nippon Acryl Chemical Co., Ltd.) and 5 parts of HYTEC E4B (an aqueous dispersion of polyethylene, produced by Toho Chemical Industries Co., Ltd.). This film was then stretched 3.2 times in the transverse direction at 110° C. and subjected to a heat-treatment at 220° C. to obtain a laminate film of 12 μm in thickness having a coating film of 0.05 μm in thickness. An adhesive was applied on the side of the obtained film opposite from the coating layer, and the laminate film was laminated on the printed surface of a printed white paper board (manila board) by means of the adhesive to obtain a printed laminate. The adhesive used was a mixture (mixing ratio of 1:1) of SEIKABOND A160 and SEIKABOND C46H (produced by Dainichi Seika Kogyo Co., Ltd.). It was applied to a coating weight of 2 g/m$^2$ (calcd. on solid basis).

EXAMPLE 2

A printed laminate was obtained by following the procedure of Example 1 except that a coating solution of the following composition was used.

| Coating solution: | |
|---|---|
| Aqueous dispersion of polyacrylate (PRIMAL HA-12, produced by Nippon Acryl Chemical Co., Ltd.) | 95 parts |
| Sodium dodecylbenzenesulfonate | 5 parts |

EXAMPLE 3

A printed laminate was obtained by following the procedure of Example 1 except that a coating solution of the following composition was used.

| | |
|---|---|
| Aqueous dispersion of polyurethane (NEOREZ R960, produced by Polyvinyl Chemical Co., Ltd.) | 90 parts |
| Aqueous dispersion of polyethylene (HYTEC E4B, produced by Toho Chemical Industries Co., Ltd.) | 10 parts |

EXAMPLE 4

A printed laminate was obtained by following the procedure of Example 1 except that a coating solution of the following composition was used.

| Coating solution: | |
|---|---|
| Aqueous dispersion of polyester (RZ-124, produced by Gooh Chemical Industries Co., Ltd.) | 95 parts |
| Aqueous dispersion of polyethylene (HYTEC E-103N, produced by Toho Chemical Industries Co., Ltd.) | 5 parts |

COMPARATIVE EXAMPLE 1

A printed laminate was obtained by following the procedure of Example 1 except that no coating layer was provided.

COMPARATIVE EXAMPLE 2

A film of 12 μm in thickness was obtained in the same way as Example 1 except that no coating layer was provided. After applying a corona discharge treatment to one side of the film, an adhesive was applied to the opposite side and the thus-obtained film was laminated on the printed surface of a printed white paper board (manila board) by means of the thus-coated adhesive to obtain a printed laminate.

COMPARATIVE EXAMPLE 3

A printed laminate was obtained by following the procedure of Example 1 except that a coating solution of the following composition was used. Coating solution:

| | |
|---|---|
| Aqueous dispersion of polyacrylate (PRIMAL HA-12, produced by Nippon Acryl Chemical Co., Ltd.) | 100 parts |

COMPARATIVE EXAMPLE 4

A printed laminate was obtained by following the procedure of Example 2 except that a coating solution of the following composition was used.

| Coating solution: | |
|---|---|
| Aqueous dispersion of polyurethane (NEOREZ R960, produced by Polyvinyl Chemical Co., Ltd.) | 100 parts |

COMPARATIVE EXAMPLE 5

An adhesive was applied on one side of a biaxially oriented polypropylene film (TORAYFAN S, produced by Toray Co., Ltd.) of 20 μm in thickness, and the thus-obtained film was laminated on the printed surface of a printed white paper board (manila board) by means of the thus-coated adhesive to obtain a printed laminate. The adhesive used was a mixture (mixing ratio of 1:1) of SEIKABOND E270 and SEIKABOND C30 (produced by Dainichi Seika Kogyo Co., Ltd.). It was applied to a coating weight of 2 $g/m^2$ (calcd. on solid basis).

The results obtained in the above-described Examples and Comparative Examples are shown in Table 1.

TABLE 1

| | Adhesiveness | | | |
|---|---|---|---|---|
| | To hot-stamping foil | To ink | Scratch resistance | Glossiness |
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Comp. Example 1 | x | x | Δ | ○ |
| Comp. Example 2 | Δ | Δ | Δ | ○ |
| Comp. Example 3 | ○ | ○ | x | ○ |
| Comp. Example 4 | ○ | ○ | x | ○ |
| Comp. Example 5 | x | x | Δ | x |

EXAMPLE 5

Polyethylene terephthalate having an intrinsic viscosity of 0.65 and containing additive particles was melt-extruded at 280–300° C. onto a cooling drum of about 60° C. applying a static charge thereon to form a sheet. The sheet was stretched 3.5 times in the machine direction at 83° C. A coating solution of the composition shown below was applied on one side of the resulting stretched film, and the coated film was further stretched 3.2 times in the transverse direction at 110° C. and then subjected to a heat-treatment at 220° C. to obtain a laminate film of 12 μm in thickness having a coating layer of 0.1 μm in thickness. An adhesive was applied on the side of the obtained film opposite from the coating layer, and the laminate film was laminated on the printed surface of a printed white paper board (manila board) by means of the adhesive to obtain a printed laminate. A mixture (mixing ratio of 1:1) of SEIKABOND A160 and SEIKABOND C46H (produced by Dainichi Seika Kogyo Co., Ltd.) was used as the adhesive. It was applied to a coating weight of 2 $g/m^2$ (calcd. on solid basis).

Composition of Coating Solution 50 parts of an aqueous dispersion of polyester A (an aqueous dispersion of a polyester composed of 56 mol % of terephthalic acid, 40 mol % of isophthalic acid, 4 mol % of 5-sodiumsulfoisophthalic acid, 70 mol % of ethylene glycol, 13 mol % of diethylene glycol and 17 mol % of 1,4-butanediol), 45 parts of an aqueous dispersion of SVS-MMA-MA-HEMA copolymer (SVS content: 25 mol %) and 5 parts of an aqueous dispersion of polyethylene (HYTEC E4B, produced by Toho Chemical Industries Co., Ltd.).

SVS: sodium vinylsulfonate
MMA: methyl methacrylate
MA: methyl acrylate
HEMA: hydroxyethyl methacrylate

EXAMPLE 6

A printed laminate was obtained by following the procedure of Example 5 except that a coating solution of the following composition was used.

Composition of Coating Solution 70 parts of an aqueous dispersion of polyester A, 25 parts of an aqueous dispersion of SVS-MMA-MA-HEMA copolymer (SVS content: 25 mol %) and 5 parts of an aqueous dispersion of polyethylene (HYTEC E4B, produced by Toho Chemical Industries Co., Ltd.).

EXAMPLE 7

A printed laminate was obtained by following the procedure of Example 5 except that a coating solution of the following composition was used.

Composition of Coating Solution 70 parts of an aqueous dispersion of polyester A, 25 parts of an aqueous dispersion of SVS-MMA-MA-HEMA copolymer (SVS content: 15 mol %) and 5 parts of an aqueous dispersion of polyethylene (HYTEC E4B, produced by Toho Chemical Industries Co., Ltd.).

EXAMPLE 8

A printed laminate was obtained by following the procedure of Example 5 except that a coating solution of the following composition was used. Composition of coating solution:

50 parts of an aqueous dispersion of polyester B (an aqueous dispersion of a polyester composed of 92 mol % of terephthalic acid, 8 mol % of 5-sodiumsulfoisophthalic acid, 75 mol % of ethylene glycol and 25 mol % of diethylene glycol), 45 parts of an aqueous dispersion of SVS-MMA-MA-HEMA copolymer (SVS content: 25 mol %) and 5 parts of an aqueous dispersion of polyethylene (HYTEC E-103N, produced by Toho Chemical Industries Co., Ltd.).

COMPARATIVE EXAMPLE 6

A printed laminate was obtained by the following procedure of Example 5 except that no coating layer was provided.

COMPARATIVE EXAMPLE 7

A laminate film of 12 μm in thickness was obtained in the same way as Example 5 except that no coating layer was provided. After conducting a corona discharge treatment on one side of the film, an adhesive was applied on the opposite side of the film, and the laminate film was laminated on the printed surface of a printed white paper board (manila board) by means of the adhesive to obtain a printed laminate.

COMPARATIVE EXAMPLE 8

An adhesive was applied on one side of a biaxially oriented polypropylene film (Torayfan S, produced by Toray Co., Ltd.) of 20 μm in thickness, and the laminate film was laminated on the printed surface of a printed white paper board (manila board) by means of the adhesive to obtain a printed laminate. The adhesive used was a mixture (mixing ratio of 1:1) of SEIKABOND E270 and SEIKABOND C30 (produced by Dainichi Seika Kogyo Co., Ltd.). It was applied to a coating weight of 2 $g/m^2$ (calcd. on solid basis).

The results obtained in the above-described Examples and Comparative Examples are shown in Table 2.

TABLE 2

| | Adhesiveness | | | | | | |
|---|---|---|---|---|---|---|---|
| | To hot-stamping foil | | To ink | | | | |
| | Before storage | After storage | Before storage | After storage | Scratch resistance | Glossiness | Surface resistivity (Ω/ ) |
| Example 5 | ○ | ○ | ○ | ○ | ○ | ○ | $5 \times 10^9$ |
| Example 6 | ○ | ○ | ○ | ○ | ○ | ○ | $6 \times 10^{10}$ |
| Example 7 | ○ | ○ | ○ | ○ | ○ | ○ | $3 \times 10^{11}$ |
| Example 8 | ○ | ○ | ○ | ○ | ○ | ○ | $6 \times 10^9$ |
| Comp. Example 6 | x | x | x | x | Δ | ○ | $10^{14}<$ |
| Comp. Example 7 | Δ | Δ | Δ | Δ | Δ | ○ | $10^{14}<$ |
| Comp. Example 8 | x | x | x | x | x | x | $10^{14}<$ |

What is claimed is:

1. A printed laminate comprising printed matter and a polyester film having at least on its side exposed to the atmosphere, a coating layer, said coating layer further comprising (i) at least one water-soluble or water-dispersible resin selected from the group consisting of cellulose derivatives, alginic acid, gum arabic, gelatin, sodium polyacrylate, polyacrylamide, polyvinyl alcohol, polyethylene oxide, polyvinylpyrrolidone, urethane resins, acrylic resins, polyamide, ether resins, epoxy resins and ester resins, and (ii) a lubricant, said polyester film being laminated on the printed surface of said printed matter.

2. A printed laminate according to claim 1, wherein said lubricant is selected from at least one of the group consisting of anionic surfactants, cationic surfactants, amphoteric surfactants, nonionic surfactants, fluoric surfactants, organic carboxylic acids or derivatives thereof, higher fatty acid alcohols, paraffins, waxes, organopolysiloxanes, and water-soluble or water-dispersible polyolefins.

3. A printed laminate according to claim 1, wherein the lubricant is present in an amount of 0.1–30 parts by weight based on 100 parts by weight of the water-soluble or water-dispersible resin.

4. A printed laminate according to claim 1, wherein the thickness of the coating layer is 0.01–3 μm.

5. A printed laminate according to claim 1, wherein said coating layer is comprised of (i) at least one water-soluble or water-dispersible resin selected from the group consisting of starch, cellulose derivatives, alginic acid, gum arabic, gelatin, sodium polyacrylate, polyacrylamide, polyvinyl alcohol, polyethylene oxide, polyvinylpyrrolidone, urethane resins, acrylic resins, polyamides, ether resins, epoxy resins and ester resins; (ii) a water-soluble or water-dispersible antistatic polymer compound having a sulfonic group or a sulfonic salt group in the molecule; and (iii) a lubricant.

6. A printed laminate according to claim 5, wherein the molecular weight of the water-soluble or water-dispersible polymeric compound is 500 or more.

7. A printed laminate according to claim 5, wherein the water-soluble or water-dispersible polymeric compound is a no-emulsifier emulsion polymer or a solution polymer of (a) at least one monomer selected from the group consisting of vinylsulfonic acid, vinylsulfonates, allylsulfonic acid, allylsulfonates, methallylsulfonic acid, methallylsulfonates, sulfopropylacrylic esters and sulfoproprylacrylic salt esters; and (b) at least one monomer selected from the group consisting of lower alcohol esters, hydroxyalkyl esters, alkoxyalkyl esters, alkylalkylene glycol esters and glycidyl esters of acrylic acid or methacrylic acid, styrene, and styrene derivatives.

8. A printed laminate according to claim 5, wherein the coating layer comprises (i) 10–90% by weight of the water-soluble or water-dispersible resin, (ii) 10–90% by weight of the water-soluble or water-dispersible antistatic polymeric compound, and (iii) 0.1–30% by weight of the lubricant.

9. A printed laminate according to claim 5, wherein the surface resistivity of the surface of the coating layer is not more than $10^{12}$ Ω/□.

10. A printed laminate according to claim 5, wherein the polyester film has said coating layer on both sides thereof.

11. A printed laminate according to claim 5, wherein the polyester film has said coating layer on its side exposed to the atmosphere and an adhesive layer or a heat-fusible polymer layer on the printed matter side of the polyester film.

12. A printed laminate according to claim 5, wherein the coating layer is disposed on the side of the polyester film exposed to the atmosphere, and an adhesive layer or a heat-fusible polymer layer is disposed on the printed matter side of the polyester film.

13. A printed laminate according to claim 5, produced by heat-bonding said printed laminate material to a printed matter.

14. A printed laminate according to claim 1, wherein the polyester film has said coating layer on both sides thereof.

15. A printed laminate according to claim 1, wherein the coating layer is disposed on the side of the polyester film exposed to the atmosphere, and an adhesive layer or a heat-fusible polymer layer is disposed on the printed matter side of the polyester film.

16. A printed laminate according to claim 1, produced by heat-bonding said printed laminate material to a printed matter.

17. A printed laminate according to claim 1 produced by heat-bonding (1) a laminate comprising:

(a) a polyester film, (b) a coating layer formed on one side of the polyester film said coating layer further comprising (i) at least one water-soluble or water-dispersible resin selected from the group consisting of cellulose derivatives, alginic acid, gum arabic, gelatin, sodium polyacrylate, polyacrylamide, polyvinyl alcohol, polyethylene oxide, polyvinylpyrrolidone, urethane resins, acrylic resins, polyamides, ether resins, epoxy resins and ester resins, (ii) a water-soluble or water-dispersible antistatic polymeric compound having a sulfonic group or a sulfonic salt group in the molecule, and (iii) a lubricant; and (c) an adhesive layer or a heat-fusible polymer layer formed on an opposite side of said polyester film to the coating layer to (2) a printed material.

18. A printed laminate material comprising (a) a polyester film; (b) a coating layer formed on one side of said polyester film, said coating layer comprises of (i) at least one water-soluble or water-dispersible resin selected from the group consisting of starch, cellulose derivatives, alginic acid, gum arabic, gelatin, sodium polyacrylate, polyacrylamide, polyvinyl alcohol, polyethylene oxide, polyvinylpyrrolidone, urethane resins, acrylic resins, polyamides, ether resins, epoxy resins and ester resins, and (ii) a lubricant; and (c) an adhesive layer or a heat-fusible polymer layer formed on an opposite side of said polyester film to the coating layer.

19. A printed laminate material comprising (a) a polyester film; (b) a coating layer formed on one side of the polyester film, said coating layer further comprising (i) at least one water-soluble or water-dispersible resin selected from the group consisting of starch, cellulose derivatives, alginic acid, gum arabic, gelatin, sodium polyacrylate, polyacrylamide, polyvinyl alcohol, polyethylene oxide, polyvinylpyrrolidone, urethane resins, acrylic resins, (ii) a water-soluble or water-dispersible antistatic polymeric compound having a sulfonic group or a sulfonic salt group in the molecule, and (iii) a lubricant; and (c) an adhesive layer or a heat-fusible polymer layer formed on an opposite side of the polyester film to the coating layer.

* * * * *